US009473568B2

(12) United States Patent
Kanakapura et al.

(10) Patent No.: US 9,473,568 B2
(45) Date of Patent: *Oct. 18, 2016

(54) DETECTING CODE INJECTIONS THROUGH CRYPTOGRAPHIC METHODS

(71) Applicant: Infosys Limited, Bangalore (IN)

(72) Inventors: Prashant Venkatesh Kanakapura, Bangalore (IN); Arjun Govindaraju, Bangalore (IN); Abishek C, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,469

(22) Filed: Mar. 30, 2015

(65) Prior Publication Data

US 2015/0207870 A1    Jul. 23, 2015

Related U.S. Application Data

(63) Continuation of application No. 13/109,748, filed on May 17, 2011, now Pat. No. 8,997,239.

(30) Foreign Application Priority Data

Mar. 31, 2011    (IN) .......................... 1051/CHE/2011

(51) Int. Cl.
| | |
|---|---|
| *G06F 21/00* | (2013.01) |
| *H04L 29/08* | (2006.01) |
| *G06F 21/51* | (2013.01) |
| *G06F 21/64* | (2013.01) |
| *H04L 29/06* | (2006.01) |
| *G06F 17/30* | (2006.01) |

(52) U.S. Cl.
CPC ......... *H04L 67/10* (2013.01); *G06F 17/30905* (2013.01); *G06F 21/51* (2013.01); *G06F 21/64* (2013.01); *H04L 63/126* (2013.01); *H04L 63/1441* (2013.01); *H04L 67/42* (2013.01); *G06F 2221/2119* (2013.01)

(58) Field of Classification Search
CPC .................... H04L 63/0428; H04L 63/126
See application file for complete search history.

(56) References Cited

U.S. PATENT DOCUMENTS

| | | | |
|---|---|---|---|
| 8,266,115 B1 * | 9/2012 | Park | 707/692 |
| 8,583,911 B1 * | 11/2013 | Miller | H04L 29/06 713/150 |
| 2007/0022420 A1 * | 1/2007 | Yamamoto | G06F 8/61 717/177 |
| 2007/0061853 A1 * | 3/2007 | Kondo | G06F 17/30017 725/89 |
| 2009/0305680 A1 * | 12/2009 | Swift | H04L 12/2602 455/414.1 |
| 2010/0146040 A1 * | 6/2010 | Ramakrishnan | H04N 7/17318 709/203 |
| 2011/0173693 A1 * | 7/2011 | Wysopal | G06F 11/3612 726/19 |
| 2011/0276804 A1 * | 11/2011 | Anzai | G06F 21/51 713/176 |

(Continued)

*Primary Examiner* — Morshed Mededi
(74) *Attorney, Agent, or Firm* — Klarquist Sparkman, LLP

(57) ABSTRACT

A method disclosed herein can include receiving content for communication to one or more network clients from a content provider, where the content includes at least a web page. A content request is received from a selected client of the one or more network clients. In response to receiving the content request, the web page is prepared for communication to the selected client. A web page identifier associated with the prepared web page is generated. The web page and the web page identifier are forwarded to the selected client. A plurality of web page identifiers associated with respective web pages within the received content can be stored. The web page identifier can be obtained from among the stored web page identifiers.

20 Claims, 5 Drawing Sheets

(56) References Cited
U.S. PATENT DOCUMENTS

2012/0137368 A1* 5/2012 Vanstone ............... G06F 21/60
726/25

2012/0226914 A1* 9/2012 Wiseman ............... G06F 21/56
713/189

* cited by examiner

FIG. 2
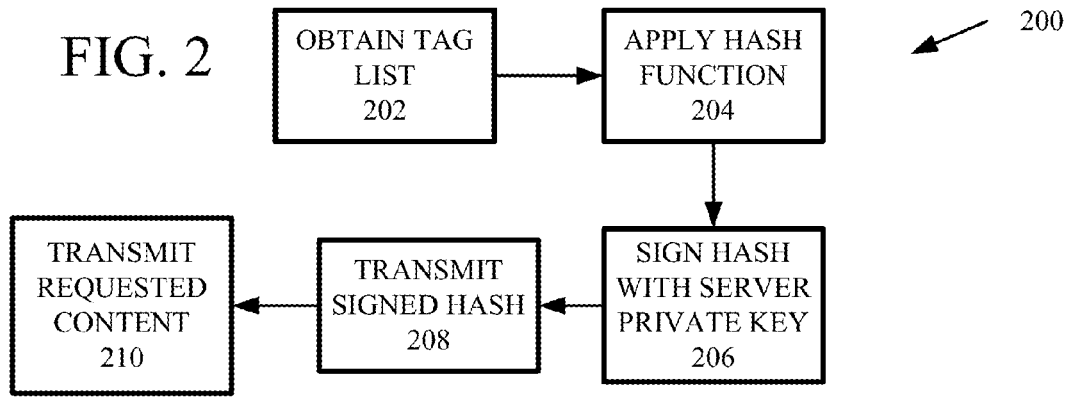
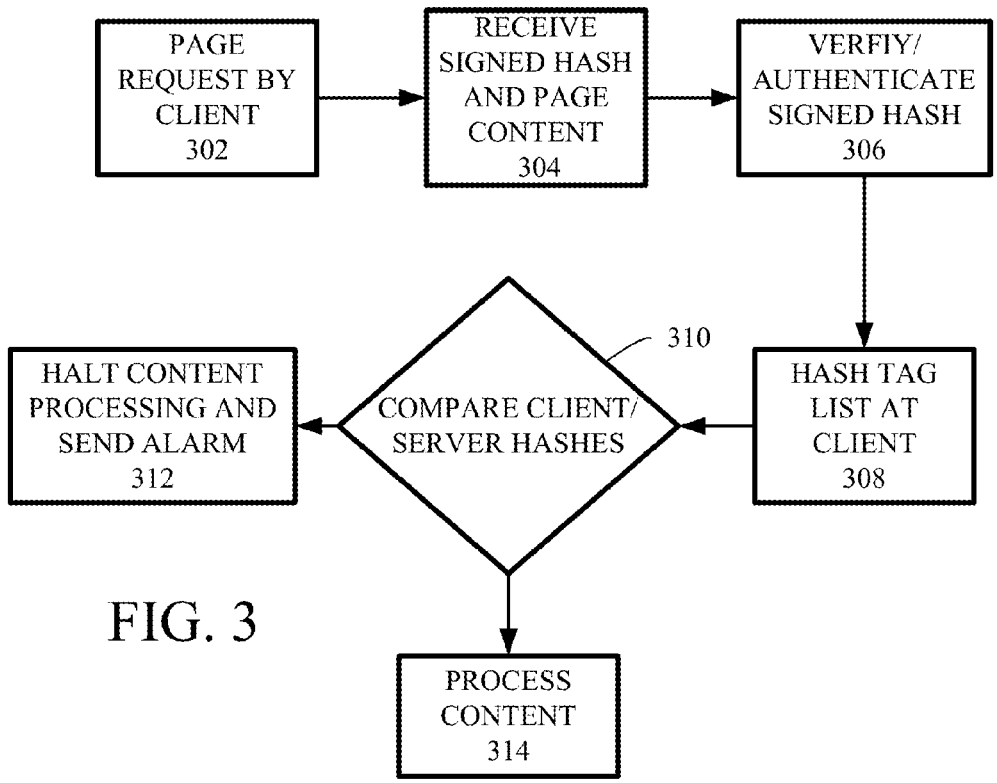
FIG. 3

```
<fieldset>
<legend>Personal Information:</legend>
Name: <input type="text" size="30" /><br />
Email: <input type="text" size="30" /><br />
Date of birth: <input type="text" size="10" /><br />
Social Security Number: <input type="text" size="20" />
</fieldset>
```

FIG. 4A

Personal Information:
Name:
Email:
Date of birth:
Social Security Number:

FIG. 4B

First name: John
Last name: Smith
[Submit]

FIG. 5

DETECTING CODE INJECTIONS THROUGH CRYPTOGRAPHIC METHODS

CROSS REFERENCE TO RELATED APPLICATION

This is a continuation of U.S. patent application Ser. No. 13/109,748, filed May 17, 2011, which claims the benefit of Indian Application No. 1051/CHE/2011, filed Mar. 31, 2011, both of which are hereby incorporated by reference.

TECHNICAL FIELD

The disclosure pertains to detection of code injections.

BACKGROUND AND SUMMARY

With the development of numerous Internet based service and content providers, users can readily request information and applications from their fixed or mobile computing devices virtually whenever and wherever they choose. Most service and content providers are available 24 hours a day, and the geographic location of providers is limited only by the availability of suitable network connections. Users have come to take for granted the constant availability of content and services, often at minimal cost.

Such Internet based provisioning presents security issues. When content is received, users typically are unable to determine if the received content is the valid content that they requested, or if a hacker or other third party has injected some unwanted content such as malicious code that can present a security risk at either the server side or the client side or both. Thus, routine interaction with content provider can present substantial security risks. Some technologies that address the potential problems of injected content are based on secure coding techniques that can reduce the likelihood of such code injection, or application firewalls that are configured to block the entry of malicious code at a content provider or a content requestor.

Disclosed herein are methods and apparatus that permit the detection of potentially malicious injected code or other injected code. In typical examples, cryptographic or similar techniques are used to provide secure, verifiable indications of possible code injections. Such techniques can be based on mathematical identifications of executable portions of code at the time of code creation or deployment and provide such identifications to both client and server for subsequent code verification. Any code injection in intermediate processes or in transit between client and server is detectable at the client as execution of a code verification process will fail to produce the anticipated identifier. In addition, the identifier can be digitally signed or authenticated so that any modification of the identifier by an intrusion process can be detectable. Upon verification failure, the client can return an alarm to the server and client side processing halted until verification is successful. With such processing, known or unknown injected malicious code (or other injected code) can be detected. Using authenticated or digitally signed identifiers, code injection from so-called man in the middle (MITM) attacks can be detected.

Typical web application components are independent and code must be verified at one or more layers. In a so-called cross-site scripting attach (XSS), malicious code is injected at the client side, and a request is transmitted to web server, and the malicious code (or by-product thereof) is stored in a database. Subsequent client/server interaction varies from the expected behavior when the malicious code is rendered to clients. By providing an identifier to a client sider application (for example, a web browser), the presence of injected code can be detected.

Methods for detecting injections comprise receiving a content digest associated with content received from a content server and determining if the received content corresponds to the content digest. The received content is processed based on the determination. In some examples, the content received from the content server includes at least one web page and determining if the received content corresponds to the content digest is based on applying a hash function to the received content. In further examples, the determining is based on a comparison of the received content digest with a received digest obtained by applying the hash function to the received content. In some examples, the received content digest is associated with static content portions, and the received content is parsed to identify static content portions and a static content digest associated with the identified static content portions is obtained. The received content is determined to correspond to the received message digest based on a comparison of the static content digest and the received content digest. In alternative embodiments, the static content digest is obtained by applying a hash function to the identified static content portions, and in some examples, the hash function is the Secure Hash Algorithm (SHA). In other embodiments, the content digest can be determined to be associated with the content provider based on a digital signature. In some particular examples, the digital signature is extracted from the content digest.

Methods of providing content on a network comprise receiving content for communication to one or more network clients from a content provider. A web page is prepared for communication to a selected client in response to a client request, and a web page identifier associated with the prepared web page is obtained. The web page and the web page identifier are forwarded to the selected client. In some examples, a plurality of web page identifiers associated with respective web pages is stored, and the web page identifier is obtained from among the stored web page identifiers. In some embodiments, the web page identifier is a hash corresponding to at least a portion of the prepared web page, such as a static portion of the prepared web page. In some representative examples, the web page identifier is a hash corresponding to one or more client-side scripts contained in the prepared web page. In still further examples, the web page identifier is associated with client-side scripts and client input fields contained in the prepared web page. In additional examples, the web page identifier is a hash of the portions of the prepared web page corresponding to the client-side scripts and the client input fields.

Computer readable storage medium are provided that contain computer-executable instructions for a method that comprises transmitting a content request to a content provider via a wide area network. Content and a content identifier are received in response to the request. Using the received content, a local content identifier is obtained based on the content as received from the content provider. The local content identifier and the received content identifier are compared, and the received content is processed based on the comparison. In some alternatives, a notification is communicated to the content provider if the received content provider and the local content identifier indicate an injection in the received content. In other examples, a warning is displayed if the received content identifier and the local content identifier indicate an injection in the received content. In typical examples, the received content identifier includes a hash of at least a portion of web page content to be provided and a digital signature associated with the content provider, so as to determine if the digital signature corresponds to the content provider. In other alternatives, the received content identifier is a digitally signed hash of at least a portion of a web page to be provided.

Systems comprise a network interface configured to transmit a request for content over a wide-area network. A processor is configured to receive content in response to the request and a hash of at least a portion of the received content, compute a local hash based on a corresponding portion of the received content, and compare the local hash and the received hash. In some examples, the processor is configured to communicate an indication of the comparison to the content provider. In other examples, systems comprise a display device, and the processor is configured to produce a display at the display device based on the comparison.

These and other features of the disclosed technology are described below with reference to the accompanying drawings.

BRIEF DESCRIPTION OF THE DRAWINGS

FIG. 2 is a block diagram of a representative method of transmitting content and a signature associate with the content.

FIG. 3 is a block diagram illustrating a representative method of receiving and validating requested content.

FIGS. 4A-4B illustrate HTML code containing an injected code portion and a displayed image rendered based upon the code.

FIG. 5 illustrates an additional rendered image displayed to a user based upon HTML code that includes injected code.

DETAILED DESCRIPTION

Figure 1:
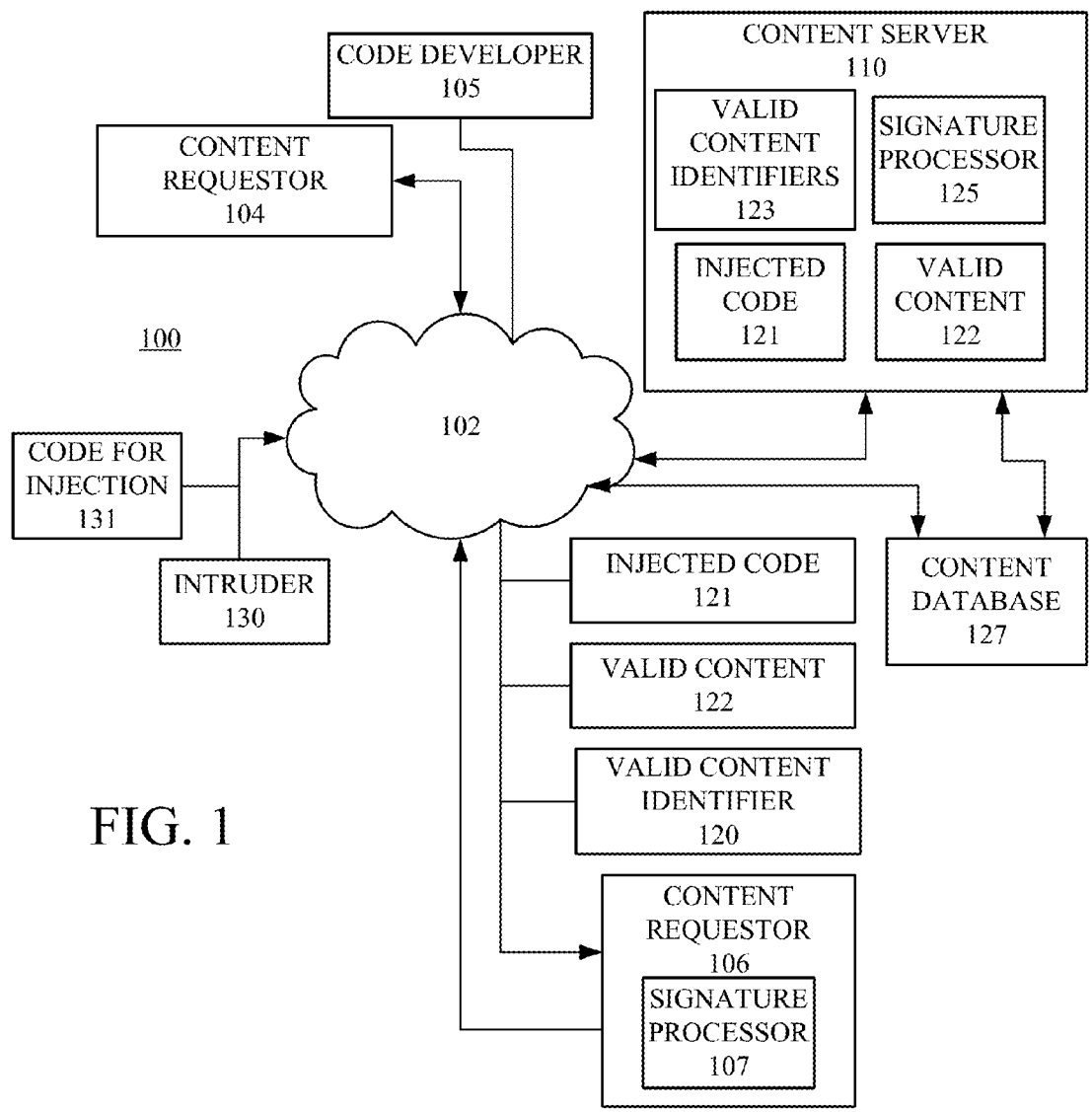
FIG. 1 is a schematic diagram illustrating injection of code by an intruder to an Internet-based content provider and detection of the injected code at a client or a server.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Methods and apparatus described herein can be applied to the detection of injected code, particularly malicious code. Such injected code can be included in one or more portions of code provided by a content provider to a client for execution. In some examples, detection of injected code according to the disclosed systems and methods permits identification of portions of content that have or appear to have been subject to code injection. Such methods and apparatus can be especially useful in that even if developers are unsuccessful in eliminating code vulnerabilities such as those associated with unscrubbed user input (i.e., user input that is parsed as unauthorized commands), the presence of injected code can be detected.

Exemplary Rendering

In any of the examples herein, indications of online services can be rendered for presentation at a user interface of a client device. Typically, such a user interface can include visible user interface elements such as text, passwords, numbers, number-only passwords, options (e.g., dropdown, popup, combo-boxes, and the like), radio buttons, checkboxes, hyperlinks, displayed fields, editable displayed fields, dates, tables, graphical buttons, graphics, drop down menus, and the like. Audio elements such as sounds or music can be included. A renderable user interface presentation can take the form of a markup language such as HTML, WML, or the like and can also include executable code such as Java, JavaScript, or the like. When rendered, the renderable user interface presentation takes the form of a user interface presentation (e.g., displayed on a client device).

Some user interface elements can be activated by a user (e.g., pressed, checked, clicked, or the like) to denote desired values, parameters, options, actions, or the like. Such activatable user interface elements include visible and audible user interface elements.

Exemplary Static Web Page Content

In any of the examples herein, static web page content can be content that does not change between viewings of the web page (e.g., the content is the same). Such content is sometimes called "hard coded" content because it does not depend on software programs to generate it. Examples of such content include HTML specifying a company name and logo, hyperlinks to "About Us," and the like. Static web page content can be hard coded into a template, or the static content can be specified by indicating a location (e.g., file name) at which the content can be found (e.g., via a conventional include tag). In this way, static content (e.g., address of a company) can be replicated throughout the web site without having to place it within multiple pages of a web site.

Exemplary Dynamic Web Page Content

In any of the examples herein, dynamic web page content is content that changes depending on various conditions in during use such as that generated by a program that draws on data sources such as databases and the like. For example, a web page can include a link to a one or more files or databases that include bank balances, prices, customer names and identification, and the like. In addition, dynamic web page content includes user input fields that permit user selection or manipulation of data or content, or are responsive to user interactions. Examples of such dynamic content include HTML tags associated with "post ACTION" tags that reference Common Gateway Interface (CGI) scripts that process user input, METHOD tags associated with use input items such as radio buttons, sizes or types of data entry in HTML forms. Other examples include FRAME tags associated with linked Web pages (HREF), APPLET or SCRIPT tags that specify the location of Java applets or scripts.

Dynamic tags such as these are particularly vulnerable to code injection. For example, such tags can permit intruders to request user information concerning passwords, credit cards, or other personal information without the user becoming aware that the request is in response to injected code, and not a request from the intended content provider.

Other dynamic code injections are based on a Structured Query Language (SQL). SQL can be used to retrieve or update database entries. Example code injections can be based on SQL Data Manipulation Language fields such as INSERT, UPDATE, DELETE and transaction controls such as START TRANSACTION, BEGIN WORK, or SAVE-TRANSACTION (SAVEPOINT), COMMIT, or ROLL-BACK. Other examples are based on SQL Data Definition Language commands such as CREATE, ALTER, or TRUNCATE that perform corresponding operations on database objects such as tables. In some examples, SQL data and time fields are used for time stamps, and commands such as TIMESTAMP are associated with dynamic content. Other examples include Data Control Language authorizations such as GRANT or REVOKE that grant and revoke access and data manipulation privileges, Other code injections are associated with command injection, XPath injection, Lightweight Directory Access Protocol (LDAP) injection. An XPath injection attack is generally similar to a SQL injection attack, but targets XML documents, not SQL databases. It will be appreciated that code injections can be based on these or other types of injections, and the disclosure is not limited to any particular type of code injection.

Injected code can be provided for client side execution or server side execution. For example, a server-side include (SSI) injection permits an intruder to introduce code into a web application for subsequent execution at the server, generally based on unsanitized user input that is eventually introduced in a server-side HTML document. By prompting a server to execute an include statement, an intruder can cause the server side application to include unauthorized code or content introduced by the include statement. For example, an intruder can modify the HTML code <p><!--#include file="content.inc"--></p> to replace content.inc with intrusion.inc or to modify or replace portions of the content.inc file to produce unintended results. Before serving an HTML web page, a content server frequently executes a server side include (SSI) in order to, for example, insert data into the served web page. The inserted data can be variable, and excluded from use in establishing code digests to be used in detected code injections.

A typical communication system that permits detection of injected code is illustrated in FIG. 1. An application development server 105 associated with code development provides application code to a content server 110 either directly or via a wide area network 102 such as the Internet. In addition to application code, the development server 105 also provides one or more application identifiers associated with the application code that can be stored at the content server 110 as one or more valid content identifiers in a database 123. The application identifiers are configured for use to verify that application code is unaltered from the code provided by the development server 105 and originated at the development server 105. In some examples, the valid content identifiers are cryptographically secured so as to include a component that permits identification of a code source. For example, the content developer 105 can produce code digests associated with one or more selected code portions, and encrypt the code digests along with, for example, a public key associated with the content developer 105. Combinations of code digests and content source identifiers can be referred to as valid content signatures. Alternatively, the content server 110 can include a component configured to process code received from the code developer and establish code digests or code signatures based on the received code. Typically the code digests are cryptographically secure and are based on application of a suitable hash function to selected code portions. In some examples, code digests can include a time stamp indicative of a date or time at which the code digest was obtained.

The content server 110 includes a signature processor 125 that is configured to verify application code based on the application identifier by decoding the signature provided and independently computing one or more components of the identifier. If the communication link between development server 105 and the content server 110 is secure, such verification can be omitted, but for transmission over a public network, verification can be used to detect code injections that occur in transit.

As shown in FIG. 1, an intruder 130 is also coupled to communicate with the content provider 110, and forward code 131 to the content provider 110. The code 131 is configured so as to become part of content provider code, resulting in injected code 121 at the content server in addition to valid content 122. In some examples, injected code such as the code 121 produces changes in one or more entries in a content database 127 or other database that is coupled to the content server 110 directly, via a local area network, or via the wide area network 102. Such injected code (or unauthorized database entry modifications) can be detected with the signature processor 125, if desired.

One or more content requestors (clients) 104, 106 are coupled to the wide area network 102 so as to send content requests and receive content from the content provider 110. In response to a content request, the clients 104, 106 receive requested (valid) content 122, injected code content 121, and an identifier 120 such as a code digest or a signed code digest associated with valid content. As shown in FIG. 1, the client 106 includes a code digest or signature processor 107 that determines a local code digest associated with actual received code (i.e., based on the combined valid and injected code as received). The local digest can be compared with the valid code digest, and if any differences are noted, processing of the received combined code can be suspended and the content server 110 notified of possible code injection.

Code digests can be produced in a variety of ways. For example, a code digest can be based on a hash of some or all code associated with content to be provided. Because typical web content contains numerous dynamic entries such as time, date, user name, as well as content from external links that can be updated in response to current news events or otherwise updated, a code digest is generally based on static content so as to avoid verification errors associated with expected, variable content. Selected portions of content can be extracted for use in code digest generation. Typical examples include content associated with user data entry such as requests for user identification or passwords, access to one or more databases, or scripts configured for execution at a client. Thus, code portions associated with drop down menus, text entry boxes, radio buttons, and other user inputs can be used in forming a content digest. Other examples include references to script files or other files that are referenced (for example, URLs), so that a local code digest and a received code digest from the content server 110 can be compared or otherwise processed to determine if code has been modified to reference different files than those intended by the code developer.

There are numerous options for code digest generation. Once some or all portions of code associated with the provision of user content have been selected, the combined portions can be supplied to a hash function that produces a hash value having a value that is reflective of the hashed content. The hash function can be selected from any available hash function depending on security and verification requirements, ease of computation, availability of hash function implementations, or other considerations. Representative example hash functions include the Secure Hash Algorithm (SHA) and the Message Digest Hash functions (also known as MD2, MD4, MD5). SHA is configured to produce a message digest (i.e., a hash) based on a message input to SHA (after padding to be a multiple of 512 bits long, if needed). It is believed to be computationally infeasible to determine the message from the SHA message hash or to find two messages that produce the same SHA message digest. However, as noted above, less secure or simpler hash functions can be used, but the properties of SHA make it infeasible for an attacker to inject code so that combined valid/injected code portions would produce the same code digest, i.e., the same validation identifier originally provided by the content developer or established by the content provider based on intended, valid content.

A representative method 200 of establishing a code digest, code signature, or certified code signature (all referred to generically herein as code validators) and communicating such validators is illustrated in FIG. 2 with reference to processing of an HTML document. At 202, a list of selected HTML tags or other HTML syntax items is selected and extracted. At 204, a hash function such as SHA is applied to the combined extracted tags to obtain a hash that can serve as a code validator. In some examples, the hash and client requested content can be communicated to the client. In other examples, the hash can be digitally signed by a server at 206, and the signed hash and requested content transmitted at 208, 210.

In some examples, a signed hash is used so that a client can verify not only that a hash value appears to be unmodified, but that the hash value is a value provided by the server (or the code developer), and not a value injected by an intruder that is based on a hash of server code including code injections. In some examples, a signed hash can be provided by encrypting the hash (the code digest) with a private key, such as the private key of the content provider or the content developer, for decryption by the client using a public key provided by the server or content provider. For additional security, the hash can be digitally signed by attaching a digital certificate associated with the content provider or the server that provides additional identity verification of the content provider or content developer based on an identity verification provided by a certifying authority. Alternatively, if a hash is deemed unlikely to be subject to modification by an intruder, insecure or primitive hash functions can be used.

Processing a client side service request is illustrated in FIG. 3. At 302 a client forwards a request for service to a content provider. Such a request can be in response to one or more specific selections provided by a content server based on a previous client/server communication or a predetermined configuration, or can be a request for access to particular content services. At 304, the requested content is received by the client along with a code validator such as a digitally signed, encrypted code digest. At 306, the client can verify or authenticate the signed hash to determine whether it appears to originate from the content provider, code developer, or other authorized source. The client process the received content at 308 by, for example, parsing the content to selected those items that have been designated for inclusion in generation of code validators, and producing a client code validator. At 310, the received code validator is compared with the client side code validator generated based on the parsed content. If the validators are the same, content is processed normally at 314, but if a discrepancy is detected, content processing can be halted and an alarm sent to the content provider at 312.

Code validators can be produced in a variety of ways. FIG. 4A illustrates a portion of HTML code configured for user input of selected items of personal information. In this example, the bold face field associated with input of a social security number is assumed to have been injected into the otherwise valid (intended) code by an intruder. A rendering of the code of FIG. 4A is shown in FIG. 4B. A code validator associated with the valid content can be based on enumeration of user input fields. In the example of FIG. 4A, valid input fields for name, email address, and date of birth are provided. Thus, a code validator could be assigned a value of three. The code of FIG. 4A can be scanned to obtain total numbers of input fields, and, in view of the additional, intruding social security number field, a client returns a value of four. Thus, the client can detect that the received code has been modified, and select a suitable response.

Other user input items such as radio buttons, dropdown menus, etc. as described above can be included in similar enumerations. Similarly, any dynamic or static code item can be included, and an enumeration based code validator used. However, more secure validators can be provided, and it is typically preferred to select some or all portions of valid code and hash the selected portions to produce a hash-based code validator. While an intruder can defeat enumeration by, for example, deleting a user input field for each input field added, it is generally infeasible to modify code in such a way that the hash of the original code and the modified code have a common hash value (code digest). In addition, by digitally signing a code digest, the provider of the code digest can be determined. An even more reliable indication of code digest validity can be obtained by also providing a digital certification of the provider based on establishing an identity with a certification authority.

In many applications, content includes code portions associated with execution of a series of program commands at a client. For example, content can include scripts for client-side execution, or links to external resources. For example, a user can be presented with a displayed "submit" button as shown in FIG. 5 that initiates a program script stored in a file user_action.asp. A code validator can be established based on an enumeration of such scripts (or links to other files), or the code can be processed to produce a cryptographically secure code validator as a hash of some or all code elements. Typically scripts include those associated with Active Server Pages (.asp files), VB Script, JavaScript, PERL, and C++. For example, such a hash permits detection of replacement of the above script with the script intruder-action.asp.

Figure 6:
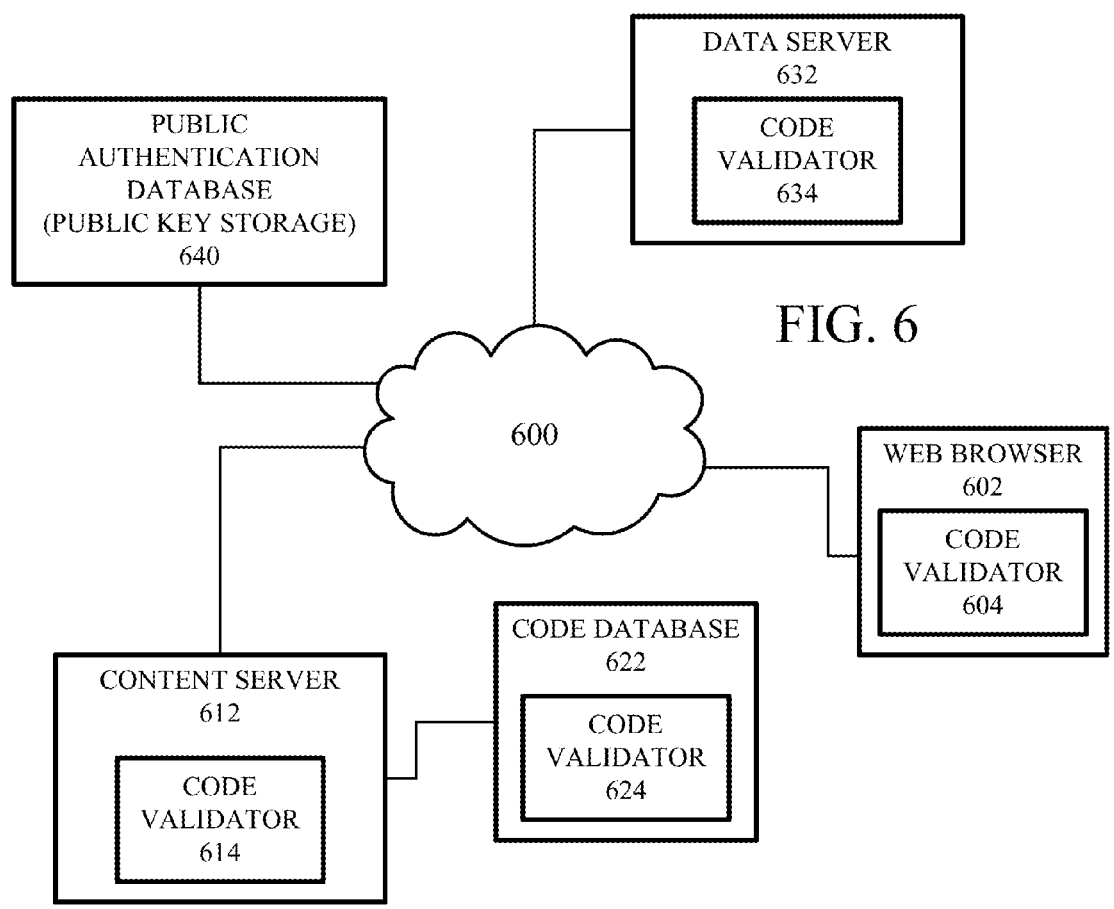
FIG. 6 is a schematic diagram illustrating a representative wide area network in which code validators are provided at content providers and clients.

FIG. 6 illustrates a representative system that includes components configured for detection of code injection. A web browser component 602 executing at a client location is coupled to a wide area network 600 such as the Internet. The web browser component 602 includes a code validator component 604 that is configured to parse received content/code and produce a code validator such as a code hash for comparison with a code validator received with the code/content. A content server 612 also includes a code validator component 614 that can parse incoming code/content, and produce a server side code validator either for use at the content server 612 to confirm receipt of uncorrupted code, or to generator suitable code validators (such as cryptographic hashes) for communication to clients along with requested content.

A code database 622 is coupled to the content server 612 (and can be coupled via the wide area network 600) and includes a code validator component 624 that is configured to generate code validation values for transmission by the content server 612 to clients. As noted above, the content server 612 can generate these values as well. In addition, by supplying code validators to the content server 612, accurate receipt of code/content can be confirmed. One or more data servers such as data server 632 can also include a code validation component 634 so that communication of corrupted or tampered data can be detected.

Figure 7:
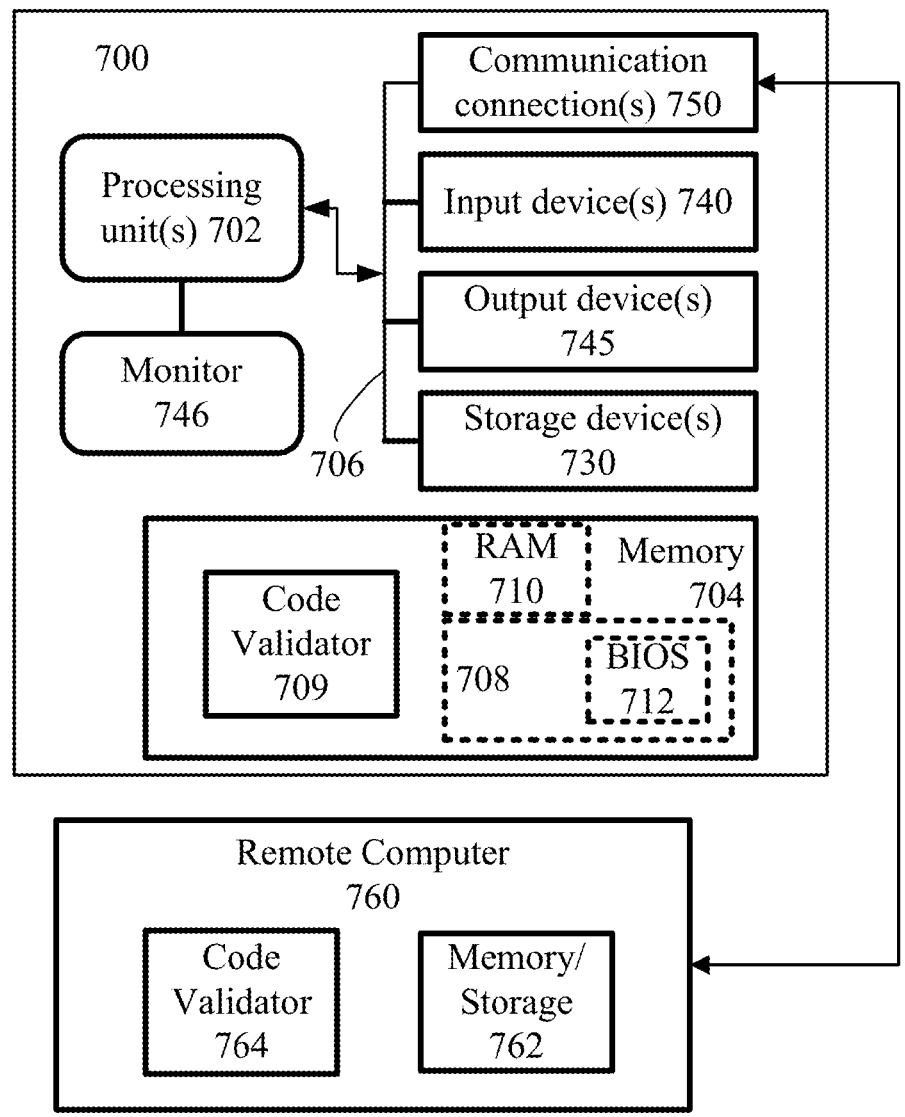
FIG. 7 is a schematic diagram illustrating representative computing systems and applications configured to perform code validation to detect injected code.

FIG. 7 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose computing device in the form of an exemplary conventional PC 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 708 and random access memory (RAM) 710. A basic input/output system (BIOS) 712, containing the basic routines that help with the transfer of information between elements within the PC 700, is stored in ROM 708. Code validation instructions 709 are also stored in the memory 704.

The exemplary PC 700 further includes one or more storage devices 730 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 706 by a hard disk drive interface, a magnetic disk drive interface, and an optical drive interface, respectively. The drives and their associated computer-readable media provide nonvolatile storage of computer-readable instructions, data structures, program modules, and other data for the PC 700. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 730 including an operating system, one or more application programs, other program modules, and program data. A user may enter commands and information into the PC 700 through one or more input devices 740 such as a keyboard and a pointing device such as a mouse. Other input devices may include a digital camera, microphone, joystick, game pad, satellite dish, scanner, or the like. These and other input devices are often connected to the one or more processing units 702 through a serial port interface that is coupled to the system bus 706, but may be connected by other interfaces such as a parallel port, game port, or universal serial bus (USB). A monitor 746 or other type of display device is also connected to the system bus 706 via an interface, such as a video adapter. Other peripheral output devices, such as speakers and printers (not shown), may be included.

The PC 700 may operate in a networked environment using logical connections to one or more remote computers, such as a remote computer 760. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 and stored code validation instructions 764 are illustrated in FIG. 7. The personal computer 700 and/or the remote computer 760 can be connected to a logical a local area network (LAN) and a wide area network (WAN). Such networking environments are commonplace in offices, enterprise-wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the only and should not be taken as a limitation on the scope of the invention. For instance, various components of systems and tools described herein may be combined in function and use. We therefore claim all subject matter that comes within the scope and spirit of the appended claims. Alternatives specifically addressed in these sections are merely exemplary and do not constitute all possible alternatives to the embodiments described herein.

We claim:

1. A method for detecting malicious injected code in a web page, comprising:
   receiving application code at a content server for communication to one or more network clients from the content server, wherein the application code comprises at least a web page;
   determining, at the content server, that the web page comprises static content and dynamic content;
   generating, at the content server, a web page identifier associated with the web page using the static content of the web page and without using the dynamic content of the web page;
   receiving a content request at the content server from a client of the one or more network clients;
   in response to receiving the content request, preparing the web page for communication to the selected client; and
   forwarding the web page to the client and forwarding the web page identifier to the client for detecting the injection of malicious code into the web page.

2. The method of claim 1, further comprising:
   generating and storing a plurality of web page identifiers associated with respective web pages within the received application code; and
   obtaining the web page identifier from among the stored web page identifiers.

3. The method of claim 1, wherein the web page identifier comprises a hash of the static content of the web page.

4. The method of claim 1, wherein the web page identifier comprises a hash associated with at least one client-side script contained in the static content of the web page.

5. The method of claim 1, wherein the web page identifier comprises a hash of portions of the static content of the web page corresponding to client-side scripts and client input fields.

6. The method of claim 1, further comprising:
   receiving a content digest with the application code; and
   determining whether the received application code corresponds to the received content digest based on a comparison of the received content digest and the generated web page identifier.

7. At least one non-transitory computer-readable storage medium containing computer-executable instructions for a method, the method comprising:
   receiving application content for communication to one or more network clients from a content provider, wherein the application content comprises at least a web page;
   parsing the web page to identify static content portions of the web page;
   generating a first web page identifier associated with the web page, the web page identifier based on the identified static content;
   receiving a content request from a selected client of the one or more network clients;
   in response to receiving the content request, preparing the web page for communication to the selected client;
   parsing the prepared web page to identify static content portions of the prepared web page;
   generating a second web page identifier associated with the prepared web page, the second web page identifier based at least in part on the identified static content of the prepared web page; and
   forwarding the prepared web page to the selected client if the second web page identifier matches the first generated web page identifier.

8. The at least one non-transitory computer-readable storage medium of claim 7, wherein the method further comprises:
   generating and storing a plurality of web page identifiers associated with respective web pages within the received application content; and
   obtaining the web page identifier from among the stored web page identifiers.

9. The at least one non-transitory computer-readable storage medium of claim 7, wherein the web page identifier comprises a hash of the static portion of the prepared web page.

10. The at least one non-transitory computer-readable storage medium of claim 7, wherein the web page identifier comprises a hash associated with at least one client-side script contained in the static portion of the prepared web page.

11. The at least one non-transitory computer-readable storage medium of claim 7, wherein the web page identifier comprises a hash of portions of the static portion of the prepared web page corresponding to client-side scripts and client input fields.

12. The at least one non-transitory computer-readable storage medium of claim 7, wherein the method further comprises:
   receiving a content digest with the application content; and
   determining whether the received application content corresponds to the received content digest based on a comparison of the received content digest and the generated web page identifier.

13. At least one non-transitory computer-readable storage medium containing computer-executable instructions for a method, the method comprising:
   receiving application content and a content digest for communication to one or more network clients from a content provider, wherein:
      the application content comprises at least a web page; and
      the content digest is based on applying one or more hash functions to at least one static content portion of the web page;
   receiving a content request from a selected client of the one or more network clients;
   in response to receiving the content request, preparing the web page for communication to the selected client;
   parsing the web page to identify at least one static content portion of the prepared web page;

generating a web page identifier associated with the prepared web page, the web page identifier based on the identified at least one static content portion of the prepared web page; and forwarding the web page and the web page identifier to the selected client, if the web page identifier matches the received content digest.

14. The at least one non-transitory computer-readable storage medium of claim 13, wherein the method further comprises:

providing a notification to the selected client, if the web page identifier does not match the received content digest.

15. The at least one non-transitory computer-readable storage medium of claim 13, wherein the method further comprises:

generating a plurality of web page identifiers associated with respective web pages within the received application content;

storing the plurality of web page identifiers; and retrieving the web page identifier from among the stored web page identifiers.

16. The at least one non-transitory computer-readable storage medium of claim 13, wherein the web page identifier comprises a hash corresponding to at least a portion of the identified at least one static content portion of the prepared web page.

17. The method of claim 1, wherein the dynamic content of the web page comprises a time and/or a date.

18. The method of claim 1, wherein the dynamic content of the web page comprises a user name.

19. The method of claim 1, wherein the dynamic content of the web page comprises content from at least one external web site.

20. The method of claim 1, wherein the web page identifier comprises a hash of a portion of the static content of the web page associated with access to one or more databases.

* * * * *